United States Patent
Kendall et al.

(10) Patent No.: US 11,697,278 B2
(45) Date of Patent: Jul. 11, 2023

(54) MEMBRANE ASSEMBLY FOR VACUUM BAGGING AND METHOD OF VACUUM BAGGING

(71) Applicant: The Boeing Company, Chicago, IL (US)

(72) Inventors: James R. Kendall, Mt. Pleasant, SC (US); Santiago M. Mejia, Johns Island, SC (US); Andrew M. Huckey, Charleston, SC (US); Raviendra S. Suriyaarachchi, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 715 days.

(21) Appl. No.: 16/846,841

(22) Filed: Apr. 13, 2020

(65) Prior Publication Data
US 2021/0316928 A1 Oct. 14, 2021

(51) Int. Cl.
*B32B 37/10* (2006.01)
*B65B 31/04* (2006.01)
*B65D 81/20* (2006.01)
*B32B 37/00* (2006.01)
*B29C 70/44* (2006.01)

(52) U.S. Cl.
CPC .......... *B32B 37/1009* (2013.01); *B29C 70/44* (2013.01); *B32B 37/0046* (2013.01); *B65B 31/04* (2013.01); *B65D 81/2023* (2013.01); *B32B 2309/68* (2013.01)

(58) Field of Classification Search
None
See application file for complete search history.

(56) References Cited

U.S. PATENT DOCUMENTS 6,458,309 B1 * 10/2002 Allen ................. B29D 99/0014
156/197

* cited by examiner

*Primary Examiner* — Christopher T Schatz
(74) *Attorney, Agent, or Firm* — Quinn IP Law

(57) ABSTRACT

A membrane assembly for vacuum bagging includes an elongate sheet of flexible material capable of being rolled up into a cylindrical configuration and unrolled from the cylindrical configuration into a flattened-out configuration, a bistable tape spring attached to or captured by the elongate sheet, and an inflatable tube attached to or captured by the elongate sheet. The bistable tape spring has a first stable state which is a straightened-out state, a second stable state which is a rolled-up state, and a transition state between the first and second stable states. The inflatable tube is sealed at one end and has an orifice at the other end for admission of a fluid therethrough for inflation of the inflatable tube.

20 Claims, 6 Drawing Sheets

MEMBRANE ASSEMBLY FOR VACUUM BAGGING AND METHOD OF VACUUM BAGGING

INTRODUCTION

This disclosure relates generally to membrane assemblies for vacuum bagging and methods for vacuum bagging.

Long structural parts may be produced using various materials and manufacturing processes. For example, stringers used in constructing aircraft fuselages are commonly made of composite materials and may be produced by vacuum bagging. These composite materials include sheets of carbon fiber fabric infused with a resin. In the vacuum bagging process, the sheets of carbon fiber are laid into the cavity of a vacuum bagging tool, which is sometimes referred to as a mandrel or kitting tray. Various layers of release films, peel plies, breathers, and bleeders are laid over the carbon fiber sheets arrayed in the cavity, with some of these layers being gas permeable. A bagging film made of a non-gas permeable material is then placed over these layers and is sealed to the tool surface by pressure-sensitive tape, two-sided tape, adhesives or the like disposed about the perimeter of the part cavity. A vacuum valve/fitting is added to or is provided as a part of the bagging film, and a hose attached to this valve/fitting is used to draw the air out of the space between the bagging film and the tool surface. As the air is being drawn out to create a vacuum, resin may be introduced into the tool cavity and the vacuum may act to help draw the resin through the carbon fiber fabric. Alternatively, the sheets of fabric may be pre-impregnated with resin (so-called "prepreg" sheets), in which case resin would not need to be introduced into the tool cavity.

Because the stringer is a very long, thin part, the vacuum bagging tool is likewise a very long, thin tool. This typically requires human operators to position a roll of bagging film at one end of the tool and then manually unroll the bagging film to the other end of the tool while walking along the full length of the tool. This process can be time-consuming and difficult for the human operators involved.

SUMMARY

According to one embodiment, a membrane assembly for vacuum bagging includes an elongate sheet of flexible material having opposed first and second distal ends, opposed first and second longitudinal edges extending generally parallel with each other between the first and second distal ends, and a roll axis defined at the second distal end and oriented generally perpendicular to the first and second longitudinal edges. The elongate sheet is capable of being rolled up about the roll axis into a cylindrical configuration and unrolled from the cylindrical configuration into a flattened-out configuration defining a longitudinal direction parallel to the first and second longitudinal edges. A bistable tape spring is attached to or captured by the elongate sheet and is disposed along the longitudinal direction, wherein the bistable tape spring has a first stable state which is a straightened-out state, a second stable state which is a rolled-up state, and a transition state between the first and second stable states. A first inflatable tube is attached to or captured by the elongate sheet and is disposed along the longitudinal direction. The first inflatable tube has a first tube end disposed proximate the first distal end and a second tube end disposed proximate the second distal end, wherein the first inflatable tube is sealed at the second tube end and has an orifice proximate the first tube end for admission of a fluid therethrough for inflation of the first inflatable tube.

The bistable tape spring may transition from one of the first and second stable states to another of the second and first stable states by application of a force that initiates the transition state from the one of the first and second stable states to the other of the second and first stable states. When the elongate sheet is rolled up in the cylindrical configuration, the bistable tape spring is in the rolled-up state and is effective to urge the elongate sheet to maintain the cylindrical configuration, and when the elongate sheet is in the flattened-out configuration, the bistable tape spring is in the straightened-out state and is effective to urge the elongate sheet to maintain the flattened-out configuration.

The membrane assembly may further include a manifold disposed proximate the first tube end and extending transverse to the longitudinal direction. The manifold may be in fluid communication with the orifice and may have a fitting therein configured for admission of the fluid into the manifold. The membrane assembly may further include a second inflatable tube attached to or captured by the elongate sheet and disposed along the longitudinal direction spaced apart from the first inflatable tube, with the second inflatable tube having a third tube end in fluid communication with the manifold and a fourth tube end disposed proximate the second distal end and being sealed.

The elongate sheet may include a sheath integral therewith and extending along the longitudinal direction, wherein the bistable tape spring is disposed within the sheath. The elongate sheet may have opposed first and second major surfaces, and the membrane assembly may further include a caul sheet attached to one of the first and second major surfaces. The membrane assembly may further include a valve disposed within the orifice at the first tube end, and the flexible material may be non-gas permeable. In the flattened-out configuration, the bistable tape spring may extend from a first tape spring end thereof disposed proximate the first distal end of the elongate sheet to a second tape spring end thereof disposed proximate the second distal end of the elongate sheet.

According to another embodiment, a membrane assembly for vacuum bagging includes: (i) a generally rectangular elongate sheet of flexible, non-gas permeable material having opposed first and second distal ends, opposed first and second longitudinal edges extending generally parallel with each other between the first and second distal ends, and a roll axis defined at the second distal end and oriented generally perpendicular to the first and second longitudinal edges, wherein the elongate sheet is capable of being rolled up about the roll axis into a cylindrical configuration and unrolled from the cylindrical configuration into a flattened-out configuration defining a longitudinal direction parallel to the first and second longitudinal edges; (ii) a bistable tape spring attached to or captured by the elongate sheet and disposed along the longitudinal direction, wherein the bistable tape spring has a first stable state which is a straightened-out state, a second stable state which is a rolled-up state, and a transition state between the first and second stable states; (iii) a manifold disposed proximate the first distal end and extending transverse to the longitudinal direction, the manifold having a fitting therein configured for admission of a fluid into the manifold; and (iv) a first inflatable tube attached to or captured by the elongate sheet and disposed along the longitudinal direction, the first inflatable tube having a first tube end in fluid communication with the manifold and a second tube end disposed proximate the second distal end and being sealed. The elongate sheet may have opposed first and second major surfaces, and the membrane assembly may further include a caul sheet attached to one of the first and second major surfaces.

According to yet another embodiment, a method of vacuum bagging includes a first step of positioning a membrane assembly on an elongate work surface. The membrane assembly is rolled up about a roll axis thereof from a previous flattened-out configuration into a cylindrical configuration and includes: (i) an elongate sheet of flexible material having opposed first and second distal ends and opposed first and second longitudinal edges extending generally parallel with each other between the first and second distal ends, with the roll axis being defined at the second distal end and being oriented generally perpendicular to the first and second longitudinal edges, and with a longitudinal direction being defined parallel to the first and second longitudinal edges; (ii) a bistable tape spring attached to or captured by the elongate sheet and disposed along the longitudinal direction, wherein the bistable tape spring has a first stable state which is a straightened-out state, a second stable state which is a rolled-up state, and a transition state between the first and second stable states; and (iii) a first inflatable tube attached to or captured by the elongate sheet and disposed along the longitudinal direction, the first inflatable tube having a first tube end disposed proximate the first distal end and a second tube end disposed proximate the second distal end, wherein the first inflatable tube is sealed at the second tube end and has an orifice proximate the first tube end. The method also includes a second step of admitting a fluid into the orifice so as to inflate the first inflatable tube and to urge the membrane assembly to unroll from the cylindrical configuration and onto the elongate work surface.

The method may further include restraining the first distal end of the elongate sheet with respect to the elongate work surface. The method may also include applying a first assistive force to the membrane assembly when in the cylindrical configuration so as to urge the membrane assembly to unroll from the cylindrical configuration and onto the elongate work surface into the flattened-out configuration. Additionally, the method may include withdrawing the fluid from the orifice so as to deflate the first inflatable tube and to urge the membrane assembly to roll back up from the flattened-out configuration, and/or exerting a second assistive force upon the membrane assembly when in the flattened-out configuration so as to urge the membrane assembly to roll up from the flattened-out configuration. The method may further include drawing a vacuum between the membrane assembly and the elongate work surface when the membrane assembly is in the flattened-out configuration on the elongate work surface, and then releasing the vacuum.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
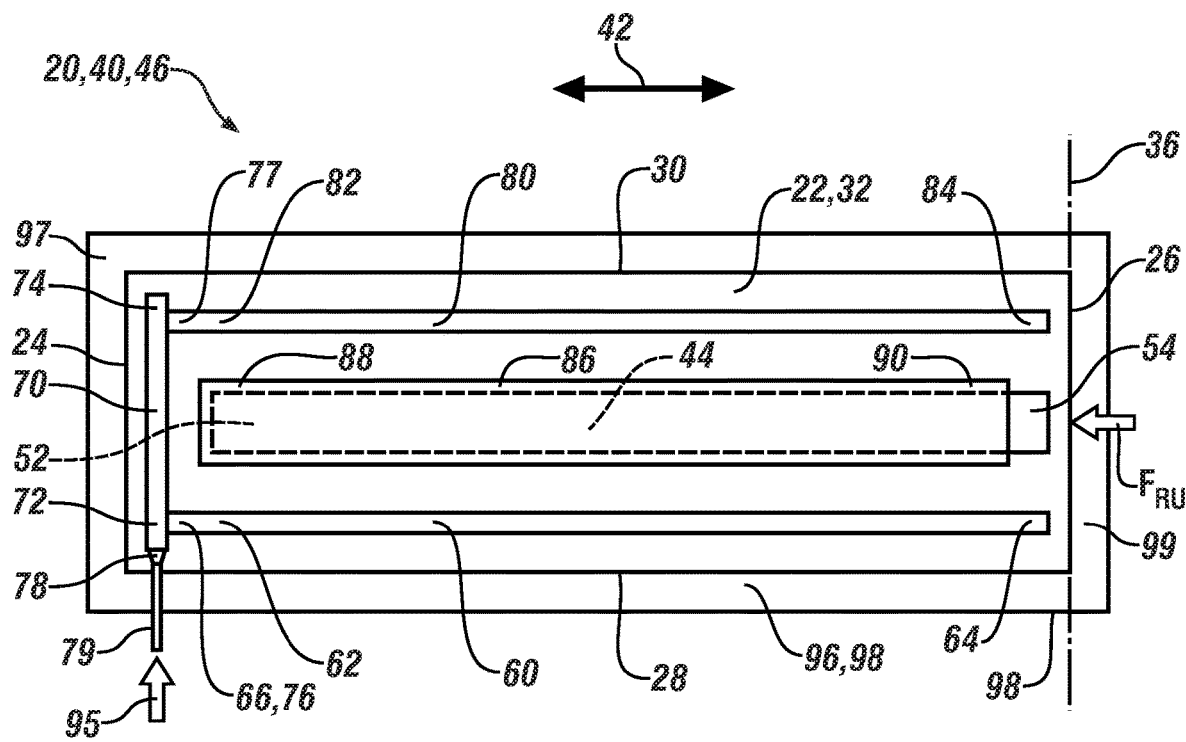
FIG. 1 is a schematic top plan view of a membrane assembly in a flattened-out configuration.

Referring now to the drawings, wherein like numerals indicate like parts in the several views, a membrane assembly 20 for use in vacuum bagging, and a method 100 for vacuum bagging utilizing the membrane assembly 20, are shown and described herein.

Figure 4:
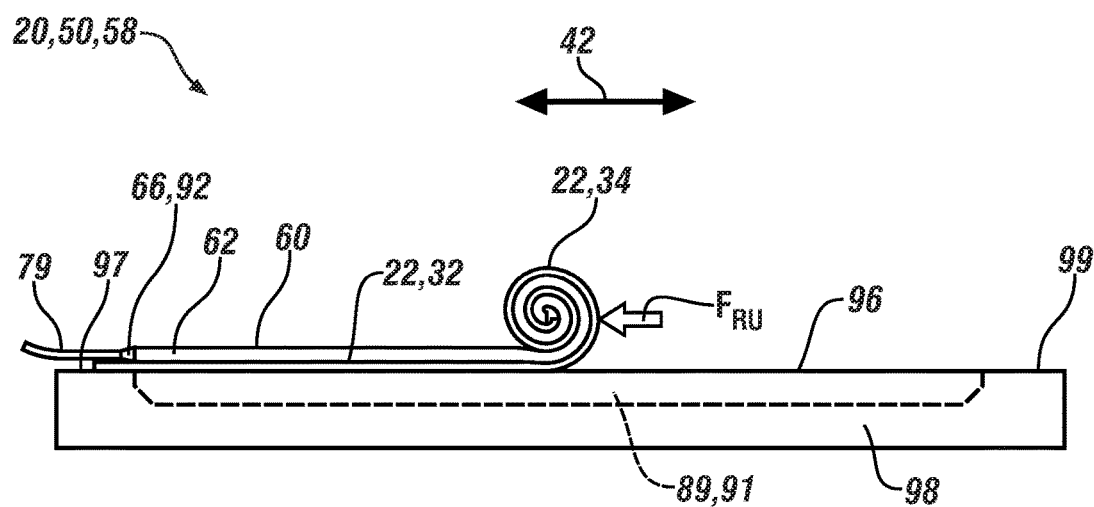
FIG. 4 is a schematic side view of the membrane assembly of FIG. 3.
Figure 5:
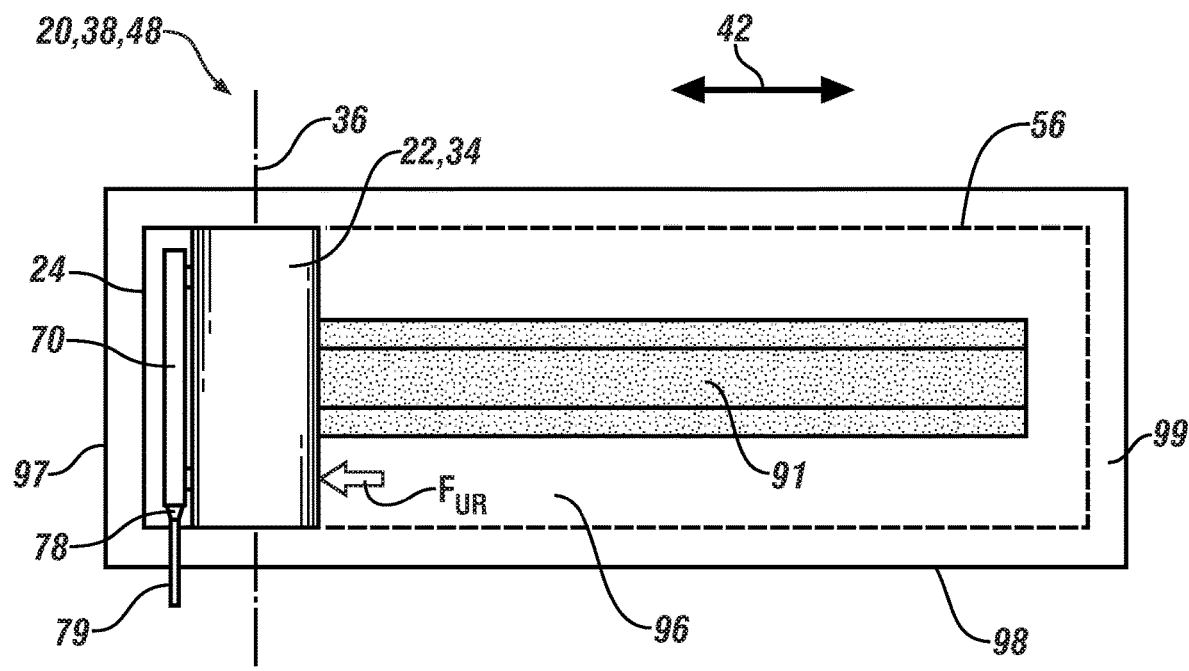
FIG. 5 is a schematic top plan view of a membrane assembly in a rolled-up cylindrical configuration.
Figure 6:
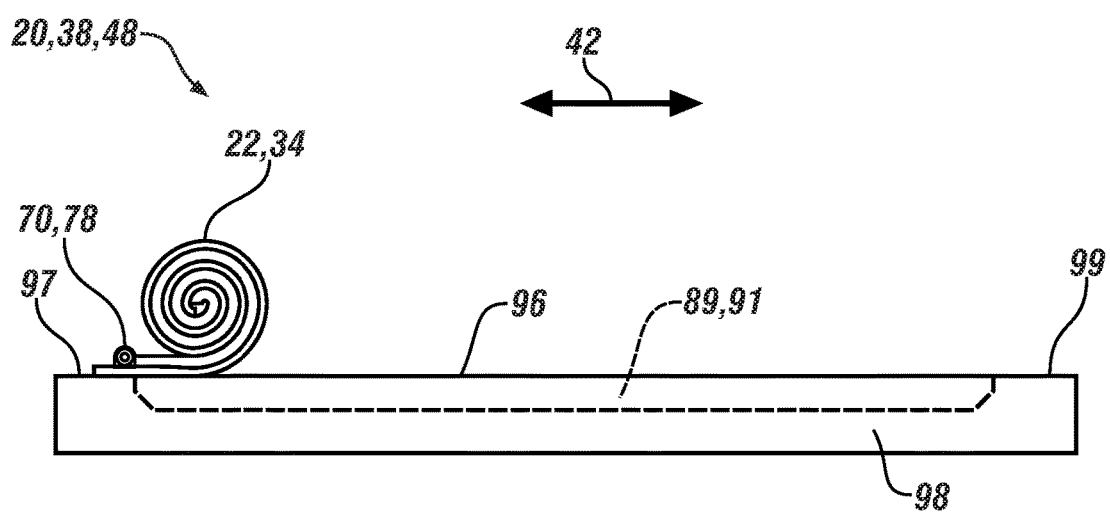
FIG. 6 is a schematic side view of the membrane assembly of FIG. 5.

The membrane assembly 20 includes a sheet 22 of flexible, non-gas permeable material which can be used for vacuum bagging (e.g., heat-stabilized, modified nylon resin film). As will be evident from the description below, the membrane assembly 20 and method 100 for vacuum bagging described herein are particularly well suited for use with very long vacuum bagging tools or mandrels 98, such as are commonly used to produce composite stringers for aircraft fuselages. As further described below, the membrane assembly 20 is configured to be rolled up into a cylindrical configuration 38 and placed on one end 97 of the vacuum bagging tool 98 (FIGS. 1-2), and then unrolled to the other end 99 of the vacuum bagging tool 98 (while passing through a transitional configuration 58 shown in FIGS. 3-4 and 7), until the membrane assembly 20 is disposed in a flattened-out configuration 40 across an elongate work surface 96 atop the vacuum bagging tool 98 (FIGS. 5-6).

Figure 2:
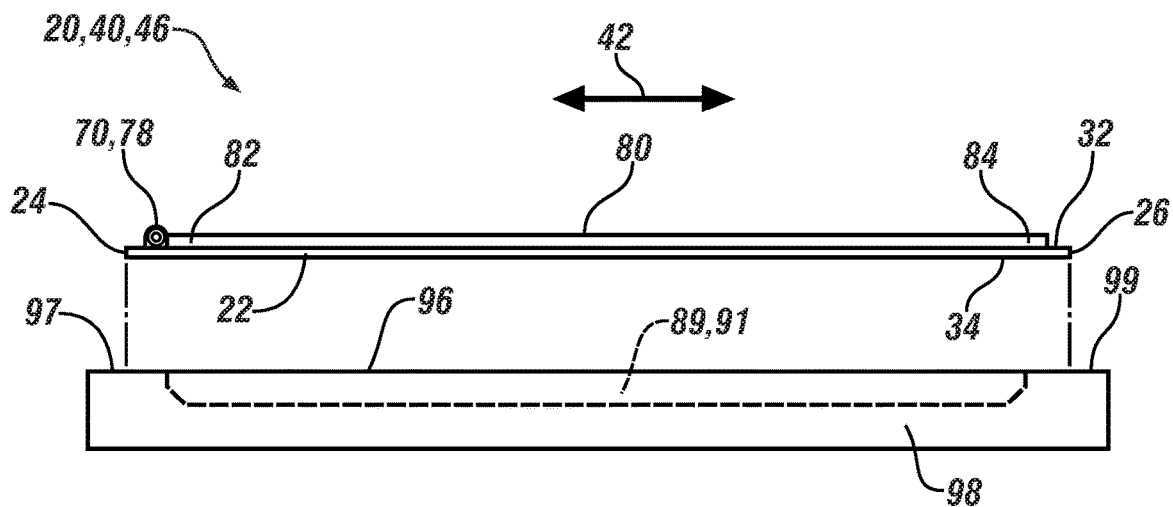
FIG. 2 is a schematic side view of the membrane assembly of FIG. 1.

FIGS. 1-2 show schematic top plan and schematic side views, respectively, of a membrane assembly 20 in the flattened-out configuration 40. The membrane assembly 20 includes an elongate sheet 22 of flexible material having opposed first and second distal ends 24, 26, opposed first and second longitudinal edges 28, 30 extending generally parallel with each other between the first and second distal ends 24, 26, and a roll axis 36 defined at the second distal end 26 and oriented generally perpendicular to the first and second longitudinal edges 28, 30. As shown in the drawings, the sheet 22 may have an overall rectangular shape with generally straight edges; alternatively, one or both of the first and second distal ends 24, 26 may be arcuate, and/or the four corners where the first and second longitudinal edges 28, 30 meet with the first and second distal ends 24, 26 may be rounded or contoured rather than being sharp corners. The elongate sheet 22 has first and second major surfaces 32, 34 and is capable of being rolled up about the roll axis 36 into a cylindrical configuration 38 and unrolled from the cylindrical configuration 38 into a flattened-out configuration 40 defining a longitudinal direction 42 parallel to the first and second longitudinal edges 28, 30.

A bistable tape spring 44 is attached to or captured by the elongate sheet 22 and is disposed along the longitudinal direction 42 with a first tape spring end 52 disposed proximate the first distal end 24 and a second tape spring end 54 disposed proximate the second distal end 26. (As used herein, "captured" means enveloped, constrained, held, etc.) The bistable tape spring 44 may be permanently or removably attached to the elongate sheet 22, or it may be embedded within the sheet 22 by co-molding or other processes, or it may be captured within a longitudinal sheath or pocket 86 on either of the first and second major surfaces 32, 34. The bistable tape spring 44 is similar to the metal measuring tape portion of a retractable tape measure in that it has a curved cross-section and two "stable" states—a rolled-up state and an unrolled/flattened-out state—with a transition state between the two stable states. (Here, "stable" describes each of the two states that the measuring tape/tape spring tends to stay in once it achieves that state, until influenced or urged by an external force to revert to the other of the two states. Thus, such measuring tapes and tape springs are described as being "bistable", or having two stable states.) The bistable tape spring 44 has a first stable state 46 which is a straightened-out state, a second stable state 48 which is a rolled-up state, and a transition state 50 between the first and second stable states 46, 48. (The transition state 50 may be viewed as an "unstable" state in that the bistable tape spring 44 tends to not remain in this transition state 50 without external force keeping it there, and instead tends to revert to one of the two stable states 46, 48.) With the bistable tape spring 44 being attached to or captured by the elongate sheet 22, when the membrane assembly 20 is in the flattened out configuration 40, the bistable tape spring 44 is in the first (straightened-out) stable state 46, and when the membrane assembly 20 is in the rolled-up cylindrical configuration 38, the bistable tape spring 44 is in the second (rolled-up) stable state 48.

A first inflatable tube 60 is attached to or captured by the elongate sheet 22 and is disposed along the longitudinal direction 42. The first inflatable tube 60 has a first tube end 62 disposed proximate the first distal end 24 and a second tube end 64 disposed proximate the second distal end 26. The first inflatable tube 60 is sealed (i.e., closed, not open to inward/outward fluid flow) at the second tube end 64 and has an orifice or opening 66 proximate the first tube end 62 for admission of a fluid 95 therethrough for inflation of the first inflatable tube 60. The fluid 95 may be air or other gas(es), or water or other liquids(s). The first inflatable tube 60 may be a separate component from the elongate sheet 22 and may be attached to the sheet 22, or the first inflatable tube 60 may be formed as an integral part of the sheet 22. A valve 92 (e.g., a Shrader-type check valve) may be disposed within the orifice 66 at the first tube end 62 to prevent fluid 95 from escaping from the first inflatable tube 60. The orifice 66 may also include a fitting to which a hose 79 may be connected for admitting fluid 95 into the first inflatable tube 60.

The membrane assembly 20 may further include a second inflatable tube 80 attached to or captured by the elongate sheet 22, with the second inflatable tube 80 being disposed along the longitudinal direction 42 and being spaced apart from the first inflatable tube 60. The second inflatable tube 80 may have a third tube end 82 disposed proximate the first distal end 24 and a fourth tube end 84 disposed proximate the second distal end 26. The second inflatable tube 80 is sealed at the fourth tube end 84 and has an orifice or opening 66 proximate the third tube end 82 for admission of a fluid 95 therethrough for inflation of the second inflatable tube 80. For membrane assemblies 20 having first and second inflatable tubes 60, 80, the first inflatable tube 60 may be disposed proximate the first longitudinal edge 28 and the second inflatable tube 80 may be disposed proximate the second longitudinal edge 30, with the tubes 60, 80 spaced equidistantly from their respective associated longitudinal edges 28, 30. The second inflatable tube 80 may be a separate component from the elongate sheet 22 and may be attached to the sheet 22, or the second inflatable tube 80 may be formed as an integral part of the sheet 22. A valve 92 may be disposed within the orifice 66 at the third tube end 82, and the orifice 66 may also include a fitting to which a hose 79 may be connected for admitting fluid 95 into the second inflatable tube 80.

Figure 3:
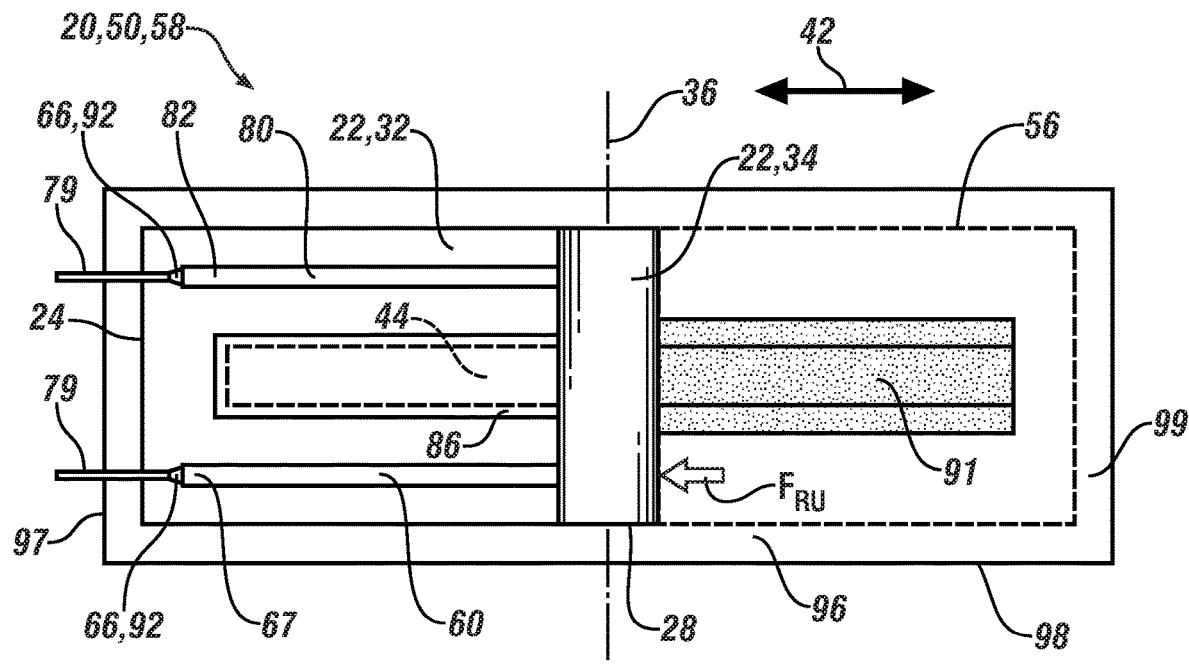
FIG. 3 is a schematic top plan view of a membrane assembly in a transitional configuration.
Figure 7:
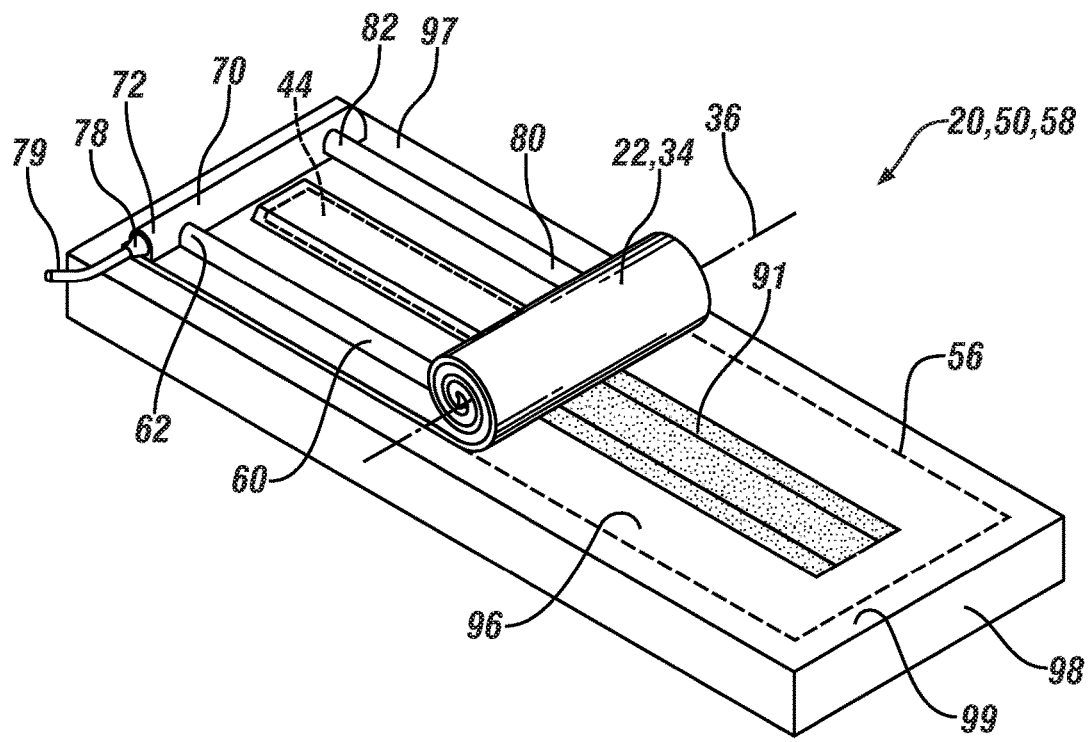
FIG. 7 is a schematic perspective view of a membrane assembly in a transitional configuration.

When the membrane assembly 20 is rolled up in the cylindrical configuration 38 (FIGS. 1-2), the bistable tape spring 44 is in the second (rolled-up) stable state 48 and is effective to urge the membrane assembly 20 to maintain the cylindrical configuration 38; likewise, when the membrane assembly 20 is in the flattened-out configuration 40 (FIGS. 5-6), the bistable tape spring 44 is in the first (straightened-out) stable state 46 and is effective to urge the membrane assembly 20 to maintain the flattened-out configuration 40. Similarly, when the membrane assembly 20 is in the transitional configuration 58 (FIGS. 3-4 and 7), the bistable tape spring 44 is in the transition state 50, which urges the bistable tape spring 44 to revert to one or the other of its first and second stable states 46, 48 (which thus urges the membrane assembly 20 into one or the other of its cylindrical and flattened-out configurations 38, 40). Note that reference numeral 56 in FIGS. 3, 5 and 7 represents the outline, perimeter or "footprint" 56 of the membrane assembly 20 on the elongate work surface 96 when the membrane assembly 20 is disposed in the flattened-out configuration 40.

The bistable tape spring 44 may transition from one of the first and second stable states 46, 48 to the other of the second and first stable states 48, 46 by application of a force that initiates the transition state 50 from the one of the first and second stable states 46, 48 to the other of the second and first stable states 48, 46. For example, when the bistable tape spring 44 is in the second (rolled-up) stable state 48 and the membrane assembly 20 is in the rolled-up cylindrical configuration 38 (FIGS. 5-6), a first assistive force $F_{UR}$ may be exerted upon the membrane assembly 20 to urge the membrane assembly 20 out of the cylindrical configuration 38, into the transitional configuration 58, and then into the flattened-out configuration 40. (Note that the subscript "UR" is used here for the first assistive force $F_{UR}$ to denote that the force urges "unrolling".) Also, when the bistable tape spring 44 is in the first (flattened-out) stable state 46 and the membrane assembly 20 is in the flattened-out configuration 40 (FIGS. 1-2), a second assistive force $F_{RU}$ may be exerted upon the membrane assembly 20 to urge the membrane assembly 20 out of the flattened-out configuration 40, into the transitional configuration 58, and then into the rolled-up cylindrical configuration 38. (Note that the subscript "RU" is used here for the second assistive force $F_{RU}$ to denote that the force urges "rolling up".)

As used herein, the first and second assistive forces $F_{UR}$, $F_{RU}$ may be forces, torques and/or impulses. The first (unrolling) assistive force $F_{UR}$ may take the form of admitting fluid 95 into and inflating the first/second inflatable tubes 60, 80, and/or it may take the form of a force, torque or impulse being exerted upon the membrane assembly 20 (e.g., a push by the hands of a human operator); likewise, the second (rolling-up) assistive force $F_{RU}$ may take the form of exhausting or withdrawing fluid 95 from and deflating the first/second inflatable tubes 60, 80, and/or it may take the form of a force, torque or impulse being exerted upon the membrane assembly 20 to help urge the rolling-up process. These assistive forces $F_{UR}$, $F_{RU}$ may be only momentary so as to merely initiate movement of the membrane assembly 20 out of the cylindrical or flattened-out configuration 38, 40 and into the transitional configuration 58, or they may continue while the membrane assembly 20 rolls up or unrolls during some or all of the time that the membrane assembly 20 is in the transitional configuration 58. Thus, the membrane assembly 20 may be urged between the rolled-up cylindrical configuration 38 and the flattened-out configuration 40 by the inflation/deflation of the first and second inflatable tubes 60, 80, by the exertion of the first/second assistive forces $F_{UR}$, $F_{RU}$, and/or by the action of the bistable tape spring 44 reverting to one or the other of its two stable states 46, 48.

The membrane assembly 20 may further include a manifold 70 disposed proximate the first tube end 62 (i.e., proximate the first distal end 24) and extending transverse to the longitudinal direction 42. For example, the manifold 70 may have a first manifold end 72 proximate the first longitudinal edge 28 and a second manifold end 74 proximate the second longitudinal edge 30. The manifold 70 may be a separate component from the elongate sheet 22 and may be attached to the sheet 22, or it may be formed as an integral part of the sheet 22. The manifold 70 may be in fluid communication with the orifices 66 of the first and second inflatable tubes 60, 80, and may have a fitting 78 therein configured for admission of fluid 95 into the manifold 70 (and thus into the first and second inflatable tubes 60, 80). The fitting 78 may include a check-valve and may be configured to sealably interface with a hose 79 for admission of fluid 95 into the manifold 70. The manifold 70 may intersect and fluidly communicate with the first and second inflatable tubes 60, 80 at respective first and second connection points 76, 77, which may correspond with or be equivalent to the respective orifices 66 at the first and third tube ends 62, 82. Note that FIGS. 1-2 and 5-7 show configurations of the membrane assembly 20 having a manifold 70 connected to a hose 79 which extends laterally across the first longitudinal edge 28 of the sheet 22, whereas FIGS. 3-4 show a configuration without a manifold 70 where two hoses 79 connect directly to the first and second inflatable tubes 60, 80 with the hoses extending longitudinally across the first distal end 24 of the sheet 22.

The elongate sheet 22 may include a sheath or pocket 86 that is integral with or attached to the elongate sheet 22 and which extends along the longitudinal direction 42. The sheath 86 has a first sheath end 88 proximate the first distal end 24 and a second sheath end 90 disposed proximate the second distal end 26. As illustrated in the drawings, the first sheath end 88 may be enclosed while the second sheet end 90 may be open, thus forming a pocket. The bistable tape spring 44 may be inserted into the opening at the second sheath end 90 with most of the bistable tape spring 44 being disposed within this sheath 86, thus allowing the bistable tape spring 44 to be removed and replaced as needed.

Figure 8:
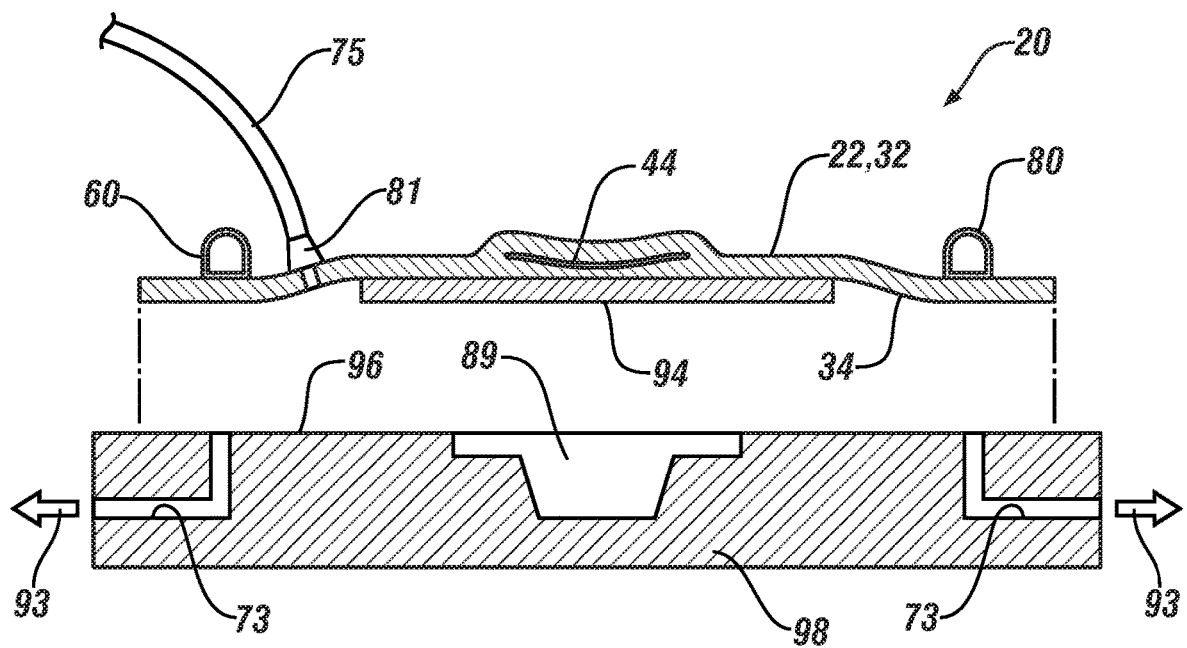
FIG. 8 is a schematic cross-sectional view of a membrane assembly including a caul sheet.

FIG. 8 shows a schematic cross-sectional view of one configuration of the membrane assembly 20 in which the bistable tape spring 44 is formed inside of the elongate sheet 22, such as by co-molding. Also shown is a cross-sectional view of the vacuum tool or mandrel 98, which has a cavity 89 in which the composite part 91 is formed, and vacuum ports 73 through which a vacuum 93 may be drawn to hold the membrane assembly 20 against the elongate work surface 96 of the tool 98. The membrane assembly 20 may further include a vacuum bag fitting 81 and a hose 75 through which a vacuum may be drawn for urging resin to propagate through the composite fibers of the composite part 91 and for urging the membrane assembly 20 into intimate contact with the part 91 and the elongate work surface 96.

Figure 10:
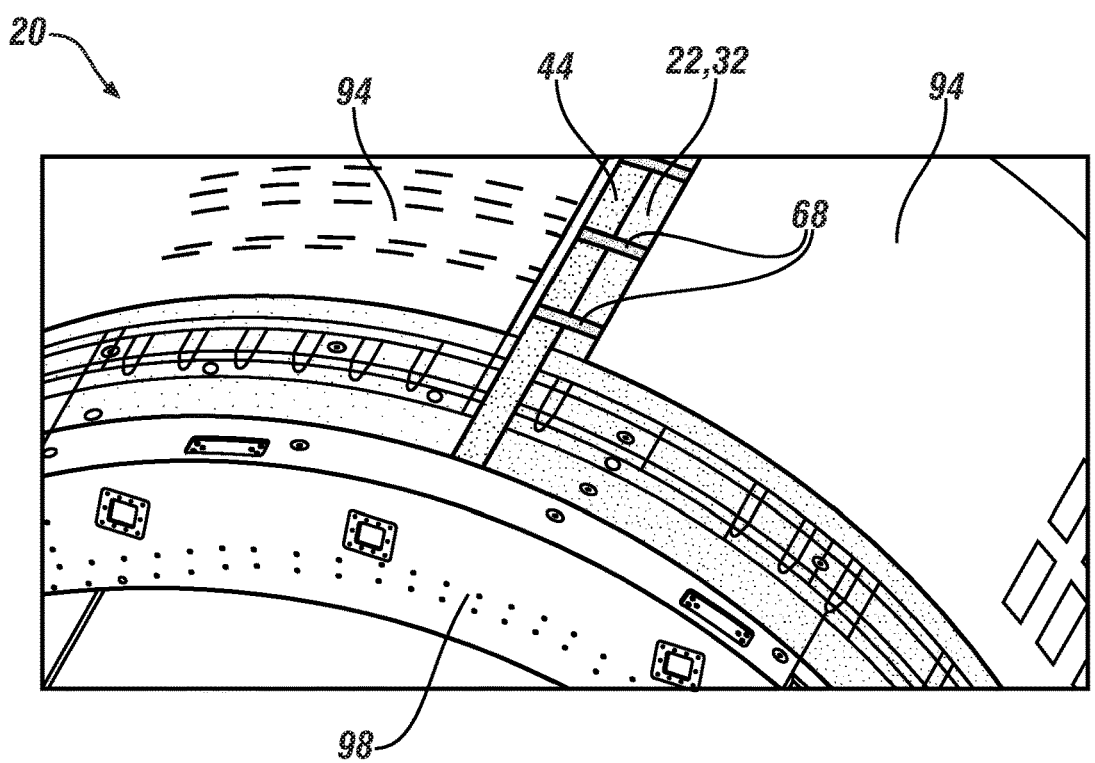
FIG. 10 is a perspective view of a vacuum forming tool and a membrane assembly with two caul sheets.

A caul plate or caul sheet 94 may be attached to one of the first and second major surfaces 32, 34 of the elongate sheet 22. For example, in FIG. 8, a caul sheet 94 is attached to the underside or second major surface 34 of the sheet 22, while in FIG. 10 caul sheets 94 are fastened with tape 68 or other otherwise adhered onto the top or first major surface 32 of the sheet 22. Alternatively, the bistable tape spring 44 itself may serve as a caul sheet 94. For example, the bistable tape spring 44 may be disposed on the underside or second major surface 34 of the sheet 22, such that when a vacuum is drawn through the hose 75 the bistable tape spring 44 would be in contact with the exposed top surface of the part 91. In such an arrangement, the bistable tape spring 44 may provide a smooth surface against the part 91, which may serve to improve or protect the surface finish of the part 91. In this arrangement, if the part 91 is a stringer, then the width of the bistable tape spring 44 may be selected to be a small amount (e.g., 0.5 inch) wider than the stringer bladder, such that the edges of the bistable tape spring 44 fall on the flanges of the stringer.

Figure 9:
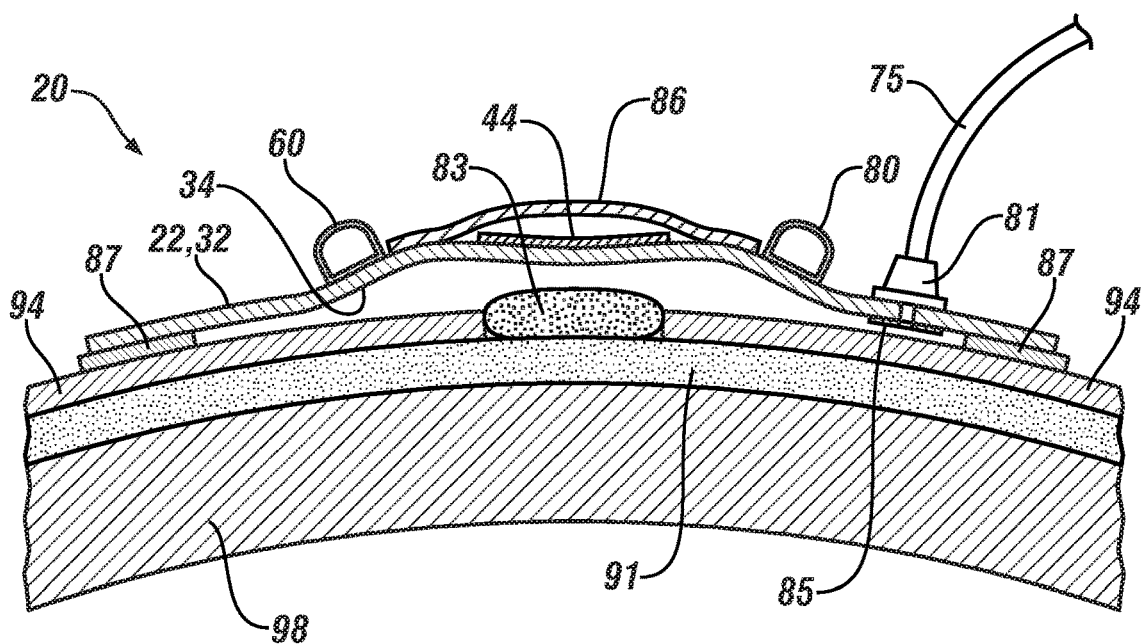
FIG. 9 is a schematic cross-sectional view of a membrane assembly bridging two caul sheets.

FIG. 9 shows a schematic cross-sectional view of a membrane assembly 20 bridging across two caul plates 94 disposed adjacent to each other. Here, the membrane assembly 20 is sealably attached to the two adjacent caul plates 94 by depositions or strips of adhesive 87 (such as two-sided tape). The two caul plates 94 are separated by a seam sealant 83 and cover a layer of composite material comprising the composite part 91, with the composite part 91 disposed atop a vacuum tool or mandrel 98. In this arrangement, the bistable tape spring 44 is captured within a sheath 86, and the membrane assembly 20 includes a vacuum bag fitting 81, a hose 75 for drawing a vacuum through the vacuum bag fitting 81, and an interflow breather 85 disposed on the underside or second major surface 34 of the elongate sheet 22.

According to another embodiment, a membrane assembly 20 for vacuum bagging includes: (i) a generally rectangular elongate sheet 22 of flexible, non-gas permeable material having opposed first and second distal ends 24, 26, opposed first and second longitudinal edges 28, 30 extending generally parallel with each other between the first and second distal ends 24, 26, and a roll axis 36 defined at the first distal end 26 and oriented generally perpendicular to the first and second longitudinal edges 28, 30, wherein the elongate sheet 22 is capable of being rolled up about the roll axis 36 into a cylindrical configuration 38 and unrolled from the cylindrical configuration 38 into a flattened-out configuration 40 defining a longitudinal direction 42 parallel to the first and second longitudinal edges 28, 30; (ii) a bistable tape spring 44 attached to or captured by the elongate sheet 22 and disposed along the longitudinal direction 42, wherein the bistable tape spring 44 has a first stable state 46 which is a straightened-out state, a second stable state 48 which is a rolled-up state, and a transition state 50 between the first and second stable states 46, 48; (iii) a manifold 70 disposed proximate the first distal end 24 and extending transverse to the longitudinal direction 42, the manifold 70 having a fitting 78 therein configured for admission of a fluid 95 into the manifold 70; and (iv) a first inflatable tube 60 attached to or captured by the elongate sheet 22 and disposed along the longitudinal direction 42, the first inflatable tube 60 having a first tube end 62 in fluid communication with the manifold 70 and a second tube end 64 disposed proximate the second distal end 26 and being sealed. The elongate sheet 22 may have opposed first and second major surfaces 32, 34, and the membrane assembly 20 may further include a caul sheet 94 attached to one of the first and second major surfaces 32, 34.

Figure 11:
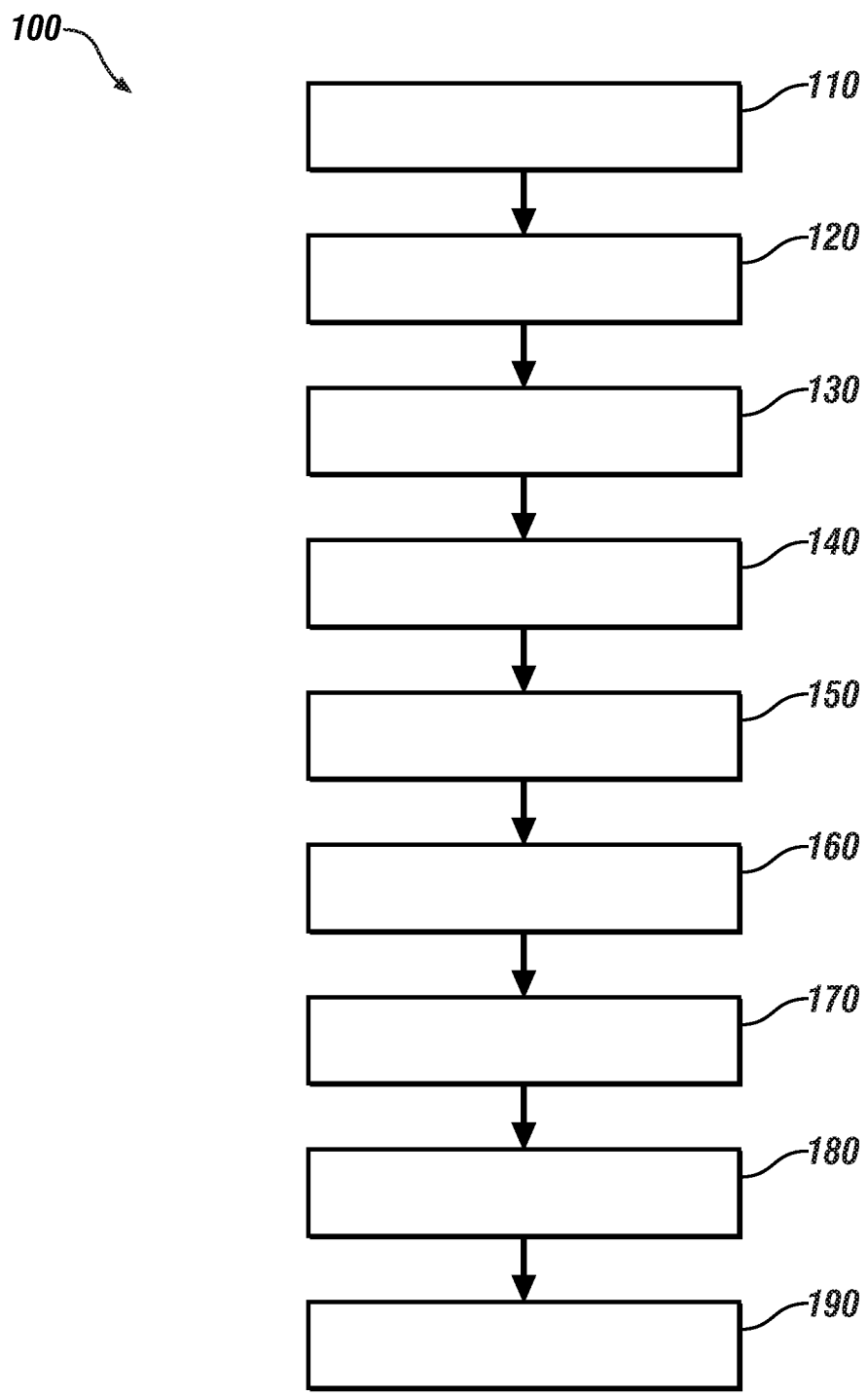
FIG. 11 is a flowchart for a method of vacuum bagging utilizing a membrane assembly.

FIG. 11 shows a flowchart for the abovementioned method 100 of vacuum bagging utilizing the membrane assembly 20. At block 110, a composite part 91 is arranged on an elongate work surface 96, such as the top surface of a vacuum forming tool or mandrel 98. For example, the composite part 91 may be an elongate stringer which may be formed and then assembled into an aircraft fuselage. The vacuum forming tool 98 may have a cavity 89 into which the composite part 91 is formed by the layup of one or more layers of carbon fiber fabric or other composite materials. At block 120, the membrane assembly 20 is positioned on the elongate work surface 96 (e.g., over the composite part 91). The membrane assembly 20 may be placed on a first end 97 of the work surface 96 in the rolled-up cylindrical configuration 38 and oriented such that when the sheet 22 unrolls, the membrane assembly 20 rolls toward a second end 99 of the work surface 96. The membrane assembly 20 is rolled up about the roll axis 36 from a previous flattened-out configuration 40 into the rolled-up cylindrical configuration 38 and includes: (i) an elongate sheet 22 of flexible material having opposed first and second distal ends 24, 26 and opposed first and second longitudinal edges 28, 30 extending generally parallel with each other between the first and second distal ends 24, 26, with the roll axis 36 being defined at the second distal end 26 and being oriented generally perpendicular to the first and second longitudinal edges 28, 30, and with a longitudinal direction 42 being defined parallel to the first and second longitudinal edges 28, 30; (ii) a bistable tape spring 44 attached to or captured by the elongate sheet 22 and disposed along the longitudinal direction 42, wherein the bistable tape spring 44 has a first stable state 46 which is a straightened-out state, a second stable state 48 which is a rolled-up state, and a transition state 50 between the first and second stable states 46, 48; and (iii) a first inflatable tube 60 attached to or captured by the elongate sheet 22 and disposed along the longitudinal direction 42, the first inflatable tube 60 having a first tube end 62 disposed proximate the first distal end 24 and a second tube end 64 disposed proximate the second distal end 26, wherein the first inflatable tube 60 is sealed at the second tube end 64 and has an orifice 66 proximate the first tube end 62.

At block 130, the first distal end 24 of the elongate sheet 22 may be restrained with respect to the elongate work surface 96, such as by clamping or holding down the first distal end 24 with clamps, weights, fasteners, magnets or the like. At block 140, a fluid 95 is admitted into the orifice 66 so as to inflate or initiate the inflation of the first inflatable tube 60 and to urge the membrane assembly 20 to unroll from the cylindrical configuration 38 and onto the elongate work surface 96. At block 150, a first assistive force $F_{UR}$ may be applied to the membrane assembly 20 when in the rolled-up cylindrical configuration 38 so as to urge the membrane assembly 20 to unroll from the cylindrical configuration 38 and onto the elongate work surface 96 into the flattened-out configuration 40. This first assistive force $F_{UR}$ may be used in conjunction with (i.e., at the same time as) the step 140 of inflating the first inflatable tube 60; or, the first assistive force $F_{UR}$ may be applied before or after the step 140 of inflating the first inflatable tube 60. The first assistive force $F_{UR}$ may be a force or torque which is applied to commence or begin the unrolling of the membrane assembly 20 from the rolled-up cylindrical configuration 38. An outer perimeter of the elongate work surface 96 may have a border of double-sided tape or adhesive 68 applied thereto, so that once the membrane assembly 20 is rolled out onto the elongate work surface 96 in the flattened-out configuration 40 (and covering the composite part 91), the double-sided tape or adhesive 68 may form an airtight seal between the membrane assembly 20 and the elongate work surface 96.

At block 160, a vacuum 93 may be drawn between the membrane assembly 20 and the elongate work surface 96. This vacuum 93 may be drawn through vacuum ports 73 formed in the vacuum tool 98 and may aid in holding the membrane assembly 20 against the elongate work surface 96. At this point, resin may optionally be injected into the composite part 91 and vacuum may be drawn through the hose 75 and vacuum bag fitting 81 so as to draw the resin through the composite fabric layers of the composite part 91. After the resin has permeated the composite part 91, the resin flow may be halted—or, if prepreg sheets are used, a predetermined amount of time may be allowed to pass—and at block 170 the vacuum 93 may be released. At block 180, the fluid 95 may be withdrawn from the orifice 66 (and thus from the interior of the first inflatable tube 60) so as to deflate or initiate deflation of the first inflatable tube 60 and to urge the membrane assembly 20 to roll back up from the flattened-out configuration 40 and into the rolled-up cylindrical configuration 38. The rate of withdrawal of the fluid 95 from the first inflatable tube 60 may be regulated in order to help control the rate at which the membrane assembly 20 rolls back up. And at block 190, a second assistive force $F_{RU}$ may be exerted upon to the membrane assembly 20 when in the flattened-out configuration 40 so as to urge the membrane assembly 20 to roll up from the flattened-out configuration 40 and into the cylindrical configuration 38. This second assistive force $F_{RU}$ may be used in conjunction with (i.e., at the same time as) the step 180 of deflating the first inflatable tube 60; or, the second assistive force $F_{RU}$ may be applied before or after the step 180 of deflating the first inflatable tube 60.

Optionally, after the holding vacuum 93 is drawn at block 160, some of the fluid 95 may be withdrawn from the first inflatable tube 60 so that the pressure therein is reduced while the vacuum 93 holds the membrane assembly 20 against the elongate work surface 96. If this is done, then after the resin filling process is completed and before block 170 (release of the vacuum 93) is executed, fluid 95 may be reintroduced into the first inflatable tube 60. Note that not all of the foregoing steps may be required; for example, one arrangement of the method 100 includes only blocks 120 and 140. The blocks may also be combined in other sequences than the exemplary sequence described above.

The above description is intended to be illustrative, and not restrictive. While various specific embodiments have been presented, those skilled in the art will recognize that the disclosure can be practiced with various modifications within the spirit and scope of the claims. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Furthermore, unless explicitly stated to the contrary, embodiments "comprising" or "having" an element or a plurality of elements having a particular property may include additional such elements not having that property.

And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A membrane assembly for vacuum bagging, comprising:
    an elongate sheet of flexible material having opposed first and second distal ends, opposed first and second longitudinal edges extending generally parallel with each other between the first and second distal ends, and a roll axis defined at the second distal end and oriented generally perpendicular to the first and second longitudinal edges, wherein the elongate sheet is capable of being rolled up about the roll axis into a cylindrical configuration and unrolled from the cylindrical configuration into a flattened-out configuration defining a longitudinal direction parallel to the first and second longitudinal edges;
    a bistable tape spring attached to or captured by the elongate sheet and disposed along the longitudinal direction, wherein the bistable tape spring has a first stable state which is a straightened-out state, a second stable state which is a rolled-up state, and a transition state between the first and second stable states; and
    a first inflatable tube attached to or captured by the elongate sheet and disposed along the longitudinal direction, the first inflatable tube having a first tube end disposed proximate the first distal end and a second tube end disposed proximate the second distal end, wherein the first inflatable tube is sealed at the second tube end and has an orifice proximate the first tube end for admission of a fluid therethrough for inflation of the first inflatable tube.

2. A membrane assembly according to claim 1, wherein the bistable tape spring transitions from one of the first and second stable states to another of the second and first stable states by application of a force that initiates the transition state from the one of the first and second stable states to the other of the second and first stable states.

3. A membrane assembly according to claim 2, wherein when the elongate sheet is rolled up in the cylindrical configuration, the bistable tape spring is in the rolled-up state and is effective to urge the elongate sheet to maintain the cylindrical configuration, and when the elongate sheet is in the flattened-out configuration, the bistable tape spring is in the straightened-out state and is effective to urge the elongate sheet to maintain the flattened-out configuration.

4. A membrane assembly according to claim 1, further comprising a manifold disposed proximate the first tube end and extending transverse to the longitudinal direction, the manifold being in fluid communication with the orifice and having a fitting therein configured for admission of the fluid into the manifold.

5. A membrane assembly according to claim 4, further comprising a second inflatable tube attached to or captured by the elongate sheet and disposed along the longitudinal direction spaced apart from the first inflatable tube, the second inflatable tube having a third tube end in fluid communication with the manifold and a fourth tube end disposed proximate the second distal end and being sealed.

6. A membrane assembly according to claim 1, wherein the elongate sheet includes a sheath integral therewith and extending along the longitudinal direction, and wherein the bistable tape spring is disposed within the sheath.

7. A membrane assembly according to claim 1, further comprising a valve disposed within the orifice at the first tube end.

8. A membrane assembly according to claim 1, wherein the flexible material is non-gas permeable.

9. A membrane assembly according to claim 1, wherein, in the flattened-out configuration, the bistable tape spring extends from a first tape spring end thereof disposed proximate the first distal end of the elongate sheet to a second tape spring end thereof disposed proximate the second distal end of the elongate sheet.

10. A membrane assembly according to claim 1, wherein the elongate sheet has opposed first and second major surfaces, and further comprising a caul sheet attached to one of the first and second major surfaces.

11. A membrane assembly for vacuum bagging, comprising:
    a generally rectangular elongate sheet of flexible, non-gas permeable material having opposed first and second distal ends, opposed first and second longitudinal edges extending generally parallel with each other between the first and second distal ends, and a roll axis defined at the second distal end and oriented generally perpendicular to the first and second longitudinal edges, wherein the elongate sheet is capable of being rolled up about the roll axis into a cylindrical configuration and unrolled from the cylindrical configuration into a flattened-out configuration defining a longitudinal direction parallel to the first and second longitudinal edges;
    a bistable tape spring attached to or captured by the elongate sheet and disposed along the longitudinal direction, wherein the bistable tape spring has a first stable state which is a straightened-out state, a second stable state which is a rolled-up state, and a transition state between the first and second stable states;
    a manifold disposed proximate the first distal end and extending transverse to the longitudinal direction, the manifold having a fitting therein configured for admission of a fluid into the manifold; and
    a first inflatable tube attached to or captured by the elongate sheet and disposed along the longitudinal direction, the first inflatable tube having a first tube end in fluid communication with the manifold and a second tube end disposed proximate the second distal end and being sealed.

12. A membrane assembly according to claim 11, wherein when the elongate sheet is rolled up in the cylindrical configuration, the bistable tape spring is in the rolled-up state and is effective to urge the elongate sheet to maintain the cylindrical configuration, and when the elongate sheet is in the flattened-out configuration, the bistable tape spring is in the straightened-out state and is effective to urge the elongate sheet to maintain the flattened-out configuration.

13. A membrane assembly according to claim 11, further comprising a second inflatable tube attached to or captured by the elongate sheet and disposed along the longitudinal direction spaced apart from the first inflatable tube, the second inflatable tube having a third tube end in fluid communication with the manifold and a fourth tube end disposed proximate the second distal end and being sealed.

14. A membrane assembly according to claim 11, wherein the elongate sheet has opposed first and second major surfaces, and further comprising a caul sheet attached to one of the first and second major surfaces.

15. A method of vacuum bagging, comprising:
positioning a membrane assembly on an elongate work surface, the membrane assembly being rolled up about a roll axis thereof from a previous flattened-out configuration into a cylindrical configuration and including:
- an elongate sheet of flexible material having opposed first and second distal ends and opposed first and second longitudinal edges extending generally parallel with each other between the first and second distal ends, with the roll axis being defined at the second distal end and being oriented generally perpendicular to the first and second longitudinal edges, and with a longitudinal direction being defined parallel to the first and second longitudinal edges;
- a bistable tape spring attached to or captured by the elongate sheet and disposed along the longitudinal direction, wherein the bistable tape spring has a first stable state which is a straightened-out state, a second stable state which is a rolled-up state, and a transition state between the first and second stable states; and
- a first inflatable tube attached to or captured by the elongate sheet and disposed along the longitudinal direction, the first inflatable tube having a first tube end disposed proximate the first distal end and a second tube end disposed proximate the second distal end, wherein the first inflatable tube is sealed at the second tube end and has an orifice proximate the first tube end; and admitting a fluid into the orifice so as to inflate the first inflatable tube and to urge the membrane assembly to unroll from the cylindrical configuration and onto the elongate work surface.

16. A method according to claim 15, further comprising:
restraining the first distal end of the elongate sheet with respect to the elongate work surface.

17. A method according to claim 15, further comprising:
applying a first assistive force to the membrane assembly when in the cylindrical configuration so as to urge the membrane assembly to unroll from the cylindrical configuration and onto the elongate work surface into the flattened-out configuration.

18. A method according to claim 17, further comprising:
withdrawing the fluid from the orifice so as to deflate the first inflatable tube and to urge the membrane assembly to roll back up from the flattened-out configuration.

19. A method according to claim 17, further comprising:
exerting a second assistive force upon the membrane assembly when in the flattened-out configuration so as to urge the membrane assembly to roll up from the flattened-out configuration.

20. A method according to claim 15, further comprising:
drawing a vacuum between the membrane assembly and the elongate work surface when the membrane assembly is in the flattened-out configuration on the elongate work surface; and
releasing the vacuum.

\* \* \* \* \*